Aug. 30, 1966    R. F. HORNER    3,269,402
THERMAL FUSE
Filed Nov. 22, 1963
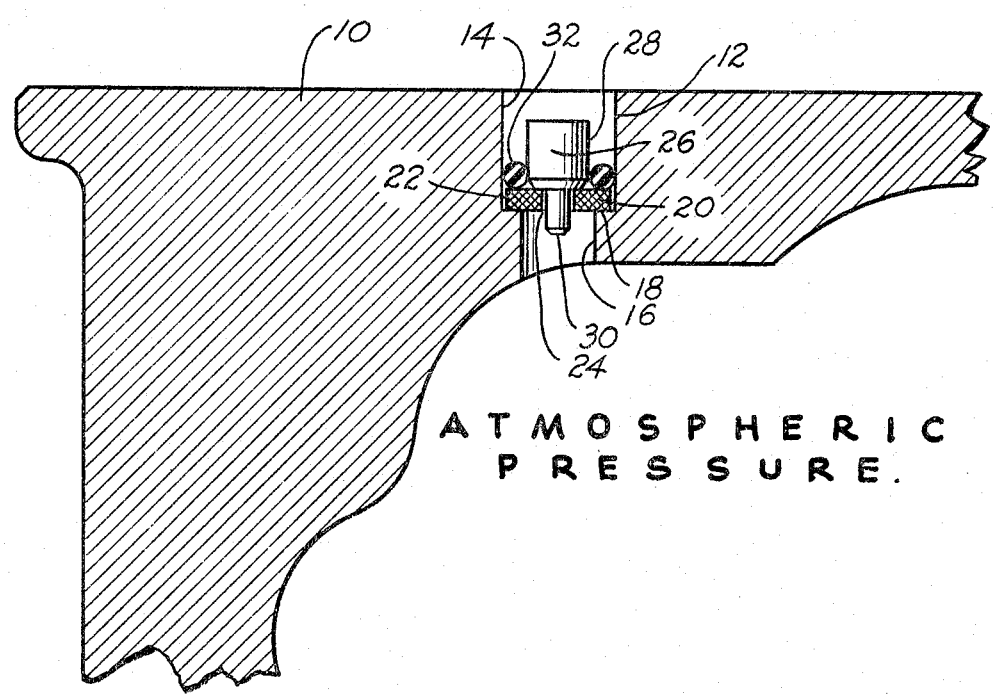
INVENTOR.
RICHARD F. HORNER.
BY
William S Thompson
ATTORNEY.

United States Patent Office 3,269,402
Patented August 30, 1966

---

3,269,402
THERMAL FUSE
Richard F. Horner, South Bend, Ind., assignor to The Bendix Corporation, South Bend, Ind., a corporation of Delaware
Filed Nov. 22, 1963, Ser. No. 325,565
4 Claims. (Cl. 137—74)

The present invention relates to an improvement in a thermal fuse adapted for use with a pressurized vessel such as an aircraft wheel and tire combination or the like to release the pressure therein when a predetermined safe temperature limit has been exceeded.

The use of thermal fuses in an aircraft wheel as an overtemperature protection device to eliminate the hazard of exploding tires has been disclosed in copending application Serial No. 821,754 entitled "Safety Device" filed June 22, 1959 in the name of George E. Stanton and commonly assigned with the present application and now Patent No. 3,201,174.

Thermal fuses have obtained wide acceptance in the field particularly in large commercial jet aircraft because of the elimination of a potential personnel hazard. An average installation will include several thermal fuses per wheel which are frequently replaced because of the tendency of low temperature fuse materials to creep and ultimately become displaced thus deflating the tire.

It is an object of the present invention to provide a thermal fuse design arranged to be removably mounted in a wheel by a low cost "O" ring and plug retaining means which eliminates the necessity of separate screw or bolt holders.

It is another object of the present design to provide a thermal fuse which utilizes in part the available pressure in an associated pressure vessel for retention.

Other objects and advantages of the present invention will become apparent from the following description and accompanying drawing.

Referring to the drawing, a fragmentary portion of a pressure vessel wall is indicated at 10 which may be an aircraft wheel rim section adapted to have a high pressure area on the upper side and a low or atmospheric pressure on the lower side thereof. Copending application Serial No. 821,754 illustrates in greater detail a suitable wheel and tire organization. The wheel rim 10 is machined to form a passage 12 having a first large diameter portion or bore 14 adjacent the pressurized side of the rim and a second smaller diameter portion or bore 16 adjacent the rim side exposed to atmospheric pressure. A shoulder 18 is formed intermediate the ends of passage 12 at the point where the large and small diameter bores meet.

A fusible alloy disc element 20 has an outside diameter 22 intermediate in size to that of bores 14 and 16 and is placed on shoulder 18 which retains the element against downward movement. Fuse disc element 20 additionally may have a pilot bore 24 at its center.

A cylindrical plug 26 has a first large segment 28 having a diameter intermediate to that of bore 16 and pilot bore 24 and a second small portion 30 having a diameter smaller than that of pilot bore 24.

An O ring 32 has an outer diameter slightly greater than bore 14 and an inner diameter slightly smaller than that of segment 28 of plug 26. The O ring is inserted in the annular space between plug 26 and through-bore 12 and is deformed to seal both the inside diameter of the through-bore and the outside diameter of the plug. The friction of the O ring provides a holding force which holds plug 26 and fusible element 20 in position during assembly.

In operation the primary holding force is obtained from the pressure within the vessel or tire which forces the parts downwardly against shoulder 18.

In event the pressure vessel or tire is subjected to an unsafe high temperature, fusible disc 20 softens losing its structural properties. The pressure within the vessel forces plug 26 through the fusible disc 20 and passes through the through-bore being ejected to the atmospheric pressure side of the vessel. The opening left after the plug pierces the fusible disc provides the necessary opening for pressure release.

Since during wheel rotation centrifugal force will urge the fuse parts outwardly, it is preferable to fabricate the plug element 26 of low density material such as plastic or aluminum, however, in each case this requirement will depend on the design parameters of each individual installation.

By observing the relative spacing between the end of the portion 30 of plug 26 and the end of the through-bore the degree of creep of the fusible element may be determined. Thus the device provides a visual means to determine the need to replace the fusible element. If desired, portion 30 may be elongated to be flush with the end of the through-bore when first installed and project outwardly therefrom after partial deformation of the fuse element and thus be more readily visible.

While the invention has been described in detail, it is my intention to cover all adaptations, modifications and arrangements which are within the skill of the art to which the invention relates.

I claim:
1. A thermal fuse for use with a pressurized vessel with a well having a stepped diameter through-bore having a large diameter portion adjacent a pressure higher than that adjacent the small diameter portion, a shoulder formed in said through-bore at the juncture of the large and small diameter portions comprising:
   a fusible disc disposed in said large diameter portion of the through-bore;
   a cylindrical plug having an outer diameter smaller than that of the small diameter portion of the through-bore, said cylindrical plug disposed in the large diameter portion of the through-bore abutting said fusible disc;
   said cylindrical plug forming an annular space with the through-bore; and
   an O-ring disposed in said annular space in sealing contact with said cylindrical plug and the through-bore, said O-ring further operative to provide a frictional holding force to retain said cylindrical plug in position.

2. A thermal fuse for use with a pressurized vessel having a wall means with a through bore formed therein, the through bore having a retaining shoulder formed therein comprising:
   a fusible disc disposed in the through bore abutting the retaining shoulder;

a plug member of smaller diameter than the retaining shoulder and disposed in the through bore, said plug member abutting said fusible disc; and an O-ring sealingly interposed between said plug member and said through bore, said O-ring operative to provide a holding force on said plug member.

3. A thermal fuse as described in claim 2 wherein:

said plug member being arranged on a side of said fusible disc exposed to the pressurized interior of the pressure vessel.

4. A thermal fuse as claimed in claim 1 wherein said fusible disc contains a centrally disposed hole therein, and a pilot projection formed on said cylindrical plug and received by said central hole in said fusible disc.

References Cited by the Examiner

UNITED STATES PATENTS

| 2,424,203 | 7/1947 | Wrightman | 137—75 X |
| 2,426,808 | 9/1947 | Auer | 137—72 X |
| 2,920,790 | 1/1960 | Quenneville | 220—89 |

FOREIGN PATENTS

| 1,278,950 | 11/1961 | France. |
| 314,724 | 7/1929 | Great Britain. |

WILLIAM F. O'DEA, *Primary Examiner.*

ISADOR WEIL, *Examiner.*

R. GERARD, *Assistant Examiner.*